April 15, 1941.  B. McCOLLUM  2,238,701
METHOD OF RECOVERING OIL FROM OIL AND GAS BEARING SANDS
Filed Jan. 9, 1939
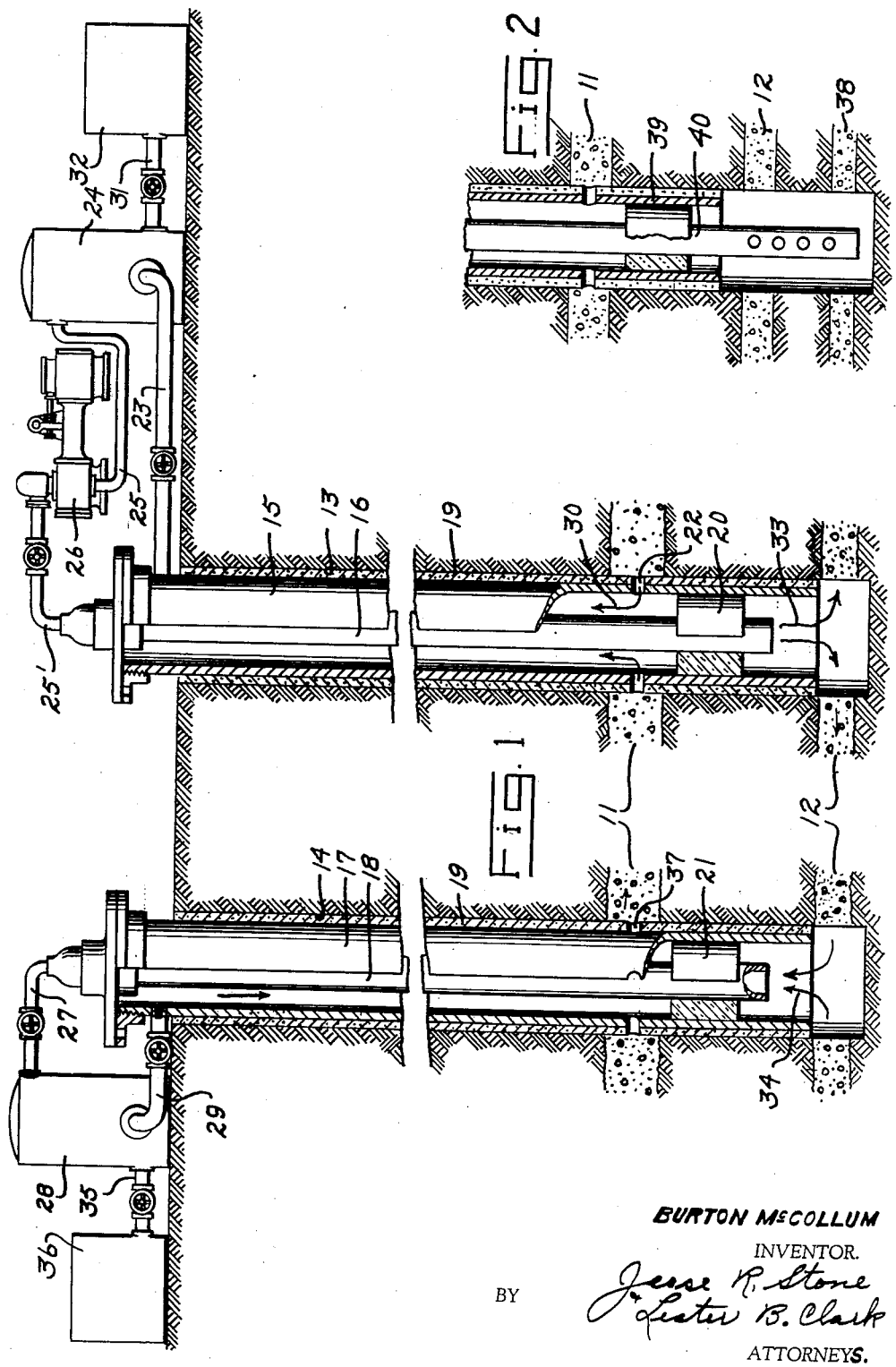
BURTON McCOLLUM
INVENTOR.
BY Jesse R. Stone
Lester B. Clark
ATTORNEYS.

Patented Apr. 15, 1941

2,238,701

UNITED STATES PATENT OFFICE 2,238,701

METHOD OF RECOVERING OIL FROM OIL AND GAS BEARING SANDS

Burton McCollum, Houston, Tex., assignor to McCollum Laboratories, Inc., a corporation of Texas Application January 9, 1939, Serial No. 249,943

8 Claims. (Cl. 166—21)

This invention relates to means and method for producing and recovering oil from oil and gas bearing sands in which the amount of gas produced with the oil is so great as to preclude efficient production in those localities in which there is no commercial use for gas.

It is well known that in oil producing territory sands are frequently encountered which contain a large amount of natural gas, and there exists generally in solution in the gas, substantial amounts of oil, particularly gasoline, which cannot be recovered except by bringing the gas to the surface. In many areas where these conditions exist there is no commercial use for the gas. Hence, it would be prohibitively wasteful to recover the oil from the gas without in some way returning the gas to the ground where it may be stored for future use.

This latter has been accomplished heretofore by what is known as the method of recycling the gas wherein spaced wells are drilled to a common sand. One of these wells is used as a producing well while the other well is used for returning the gas to the same sand from which it was produced.

In accordance with this method gas is produced from the producing well and is passed thru a suitable separating device in which a substantial part of the oil is removed from the gas and is drawn off to a suitable storage tank or pipeline. The gas then passes out of the separating device to a pump which raises the pressure a sufficient amount to force the gas to flow thru a pipeline to the other well and thence into the same producing horizon.

In this specification the term "separator" is used to designate any means of separating oil from the gas, such as mechanical separators, absorption plants, refrigeration devices, or other means applicable to extracting the oil, whether such oil be in the liquid or vapor phase.

Various difficulties accompany the method heretofore used. One of the greatest difficulties is that high pressure gas pipelines must be used to connect the wells by means of which the method is carried out. Such pipelines are not only very expensive but in thickly populated areas they also constitute a hazard to life and property.

The method just described is the only one at present available where only a single sand is encountered in the area under consideration. In many areas, however, there exists two or more sands which are similar in character and in such areas a much improved method of recycling the gas can be applied in accordance with the present invention.

It is the general object of the invention to provide a new and useful improvement in means and method for recovering oil from oil and gas bearing sands.

A further object is to provide means and method for recovering such oil without the waste of gas and by the use of equipment which is both simple and effective.

Still another object is to provide a recycling method of recovering oil from oil and gas bearing sands without the use of a high pressure pipeline at or near the surface.

Still another object is to produce oil from sands having a high gas-oil ratio by utilizing two or more wells, each of which is provided with a plurality of passages terminating at one or more of the existing sand strata. The gas issuing from one of such sands is conducted to the surface where oil in solution is removed, the gas thereafter being returned thru another passageway to a different sand or sands whence it is conducted to the other well for a similar operation before being returned to the producing sand of the first well.

Other objects together with the foregoing will be apparent from the following description taken in connection with the drawing in which:

Fig. 1 is a sectional view thru the earth showing spaced wells equipped in accordance with the invention.

Fig. 2 is a sectional view of the lower end of a well showing an alternative construction of the invention whereby a plurality of sands may be subjected to a recycling operation in accordance with the invention.

Referring to Fig. 1 of the drawing there is shown producing sands 11 and 12 carrying large amounts of gas along with the oil, the oil in general being in solution in the gas. In the application of my invention wells 13 and 14 are drilled. Each of these wells penetrates both of the sands 11 and 12.

In preparing these wells for production two strings of tubing are run in each well, the outer string or casing 15 and an inner string 16 in well 13; and an outer string or casing 17 and an inner string 18 in the well 14. The outer string of casing in each of the wells is preferably cemented in the conventional manner by means of the cement column 19 which may extend all or a part of the way from the sand 11 to the surface.

Between the two strings of tubing 15 and 16 in well 13 and intermediate the sands 11 and 12 there is provided a gas tight packing 20. This packing may be of cement or any one or more of a number of such devices as are well known in the art of oil production. Similarly in well 14 there is provided a packing device 21 between the two strings of tubing 17 and 18 and intermediate the sands 11 and 12.

The outer tubing string or casing in each of the wells is perforated in the sand 11 as shown at 22 and 37. It is believed apparent that with the construction thus far described each of the wells can be put on preliminary production by the employment of well known technique which is not a part of the present invention. The upper sand 11 is temporarily produced in well 13 thru the annular spaces between the tubing strings 15 and 16 as indicated by the arrow 30. In a similar manner well 14 is placed on preliminary production from sand 11 thru the annular spaces between tubing strings 17 and 18. Likewise, both wells are placed on preliminary production thru the innermost tubing which extends to a point below the packer and adjacent the producing sand 12. The purpose of this preliminary production is to thoroughly clean the sands and the respective strings of tubing from drilling mud and loose particles of sand that usually accompany the first fluid or gas produced by a well.

After the wells 13 and 14 have been thoroughly cleaned by preliminary production they are ready to be interconnected as a permanent installation. Such installation is effected in the following manner. The casing 15 of well 13 is connected thru a gas flow line 23 which leads to a separating device 24. The gas is conducted from the separator 24 thru line 25 to pump 26 and thence thru line 25' to the inner tubing string 16 in the well. Similarly on well 14 there is provided a flow line 27, a separator 28 and a return line 29.

The construction as just described operates as follows:

Upon starting the pump 26 gas flows out of the sand 11 thru perforations 22 in well 13 and flows up the annular space between the casing strings 15 and 16, as shown by the arrow 30. As the gas passes thru the separator 24 a substantial part of the oil contained in the gas is separated out and is drawn off thru the oil line 31 to the storage tank or pipe line 32. The gas, after removal of the oil, passes out thru the return line 25 to the pump 26 where the pressure is stepped up sufficiently to force the gas down thru the inner tubing string 16 and into the sand 12 as shown by the arrows 33. This gas then travels thru sand 12, forcing ahead of it the gas originally in this sand, which gas contains considerable quantities of oil.

The forcing of the dry gas into sand 12 in this manner sets up an increased pressure in sand 12, which in turn causes gas to flow from the sand 12 into the bottom of well 14, as shown by the arrows 34, whence it passes up inside the inner tubing string 18 out thru the flow line 27 and to the separator 28 where the oil is extracted and transmitted thru the oil line 35 to the storage tank or pipe line 36. The dry gas is then forced to flow thru the return line 29 whence it enters the outer string of tubing or casing 17, and passes downwardly to the sand 11, where it passes out thru perforations 37 and into the sand 11. It will thus be seen that the same amount of gas taken from sand 11, thru well 13 is later delivered into sand 12 and, similarly, the same amount of gas taken from sand 12 thru well 14, is delivered back again into sand 11. There is thus substantially no wastage of gas and no appreciable loss of pressure in either sand. The useful purpose accomplished is the bringing to the surface of the oil carried by the gas and the separation of this oil from the gas, followed by the return of the dry gas to the storage reservoir. By continuing this process a sufficient length of time, practically all of the oil can be removed from the gas in both sands, and still leave both sands sufficiently charged with dry gas which is available at any future time that there may be a demand for same.

An advantage of the method herein described over other methods heretofore proposed for recycling gas lies in the fact that each well drilled is both a producing well and a return well, thus eliminating the necessity of drilling wells for the sole purpose of returning gas to the sand. There is a further advantage in that the recycling of the gas between the two wells is accomplished solely thru the medium of the two sands and without the use of any pipe lines on the surface connecting the two wells. Inasmuch as an efficient recycling system requires that the wells be placed far apart, often several miles, the elimination of the surface connecting pipe lines results in a great saving of installation costs, and it further eliminates the serious hazards that result from running high pressure gas lines along the surface, particularly in well populated districts.

The principle herein outlined can be extended to apply to cases where there are more than two sands. If, for example, there are three sands, as shown in Fig. 2, one of the sands, such as 11, can be made to communicate with the outer tubing string 39, and the other two sands 12 and 38 can be made to communicate with the inner tubing string 40. A similar arrangement in another well used conjointly with this one, as a recycling unit, is used in the manner described above. Obviously, if there were four sands, the same principle could be made to apply by using four strings of casing in each well and so arranging the strings that each string of casing communicates with a separate sand in each well.

Broadly the invention contemplates a new and useful improvement for recovering oil from strata of gas sands capable of producing oil with a high gas-oil ratio.

What is claimed is:

1. The method of recovering oil from a plurality of sand strata comprising the steps of producing spaced wells from separate strata, separating the gas from other well fluids at each well, and returning the gas at each well to the stratum from which production is effected at another of the wells.

2. The method of recovering oil from a plurality of spaced geological strata comprising the steps of producing well fluids from separate strata through spaced wells, separating the gas from other well fluids, and returning gas through each well to the stratum from which production is effected at another of said wells.

3. The method of recovering oil from spaced sand strata comprising the steps of producing a pair of spaced wells from the spaced strata, separating the gas from other well fluids, pumping the gas at one of the wells into the stratum produced by the other well, and returning the gas from said other well to the first well through the other of said strata.

4. The method of recovering liquids from spaced geological strata comprising the steps of providing a pair of spaced wells penetrating each of the strata, producing each of said wells from one of the strata, separating the gas from the entrained constituents, and returning the gas at each well to the stratum from which production is effected at the other of the wells.

5. The method of recovering liquids from a plurality of spaced geological strata in the earth comprising the steps of producing liquid and gaseous hydrocarbons from at least one of said strata in a zone in a producing area, producing liquid and gaseous hydrocarbons from another of said strata in a zone in said producing area in spaced relation with said first mentioned zone, separating the liquid and gaseous hydrocarbons so produced, and returning gaseous hydrocarbons at each of said zones to the stratum from which production is effected at the other of said zones.

6. The method of recovering liquids from a plurality of oil and gas bearing sands comprising the operation of a plurality of wells penetrating said sands, said wells being provided with passages communicating exclusively with certain of said sands to provide conducting passageways leading to the surface, separating the gas and entrained constituents at each of the wells, and returning the gas at each well to certain other of the sands through a passage in such well.

7. The method of recovering oil from a plurality of gas bearing sands comprising the operation of a plurality of wells penetrating said sands, said wells being provided with passages communicating exclusively with certain of said sands to provide conducting passageways leading to the surface, separating the gas and entrained constituents, returning the gas at each well to certain other of the sands through a passage in such well, and causing said gas to circulate between the wells through said strata.

8. In a method of producing, recovering and reinjecting hydrocarbon fluids in a field having at least two separate producing formations, said method comprising producing hydrocarbon fluids separately from each of said formations, recovering valuable liquid hydrocarbons from the hydrocarbon fluids thus produced and recycling at least a major part of the gas from which said valuable liquid hydrocarbons have been recovered to each of said two formations, the improvement which comprises producing said hydrocarbon fluids from one of said formations through a well and reinjecting gas stripped of valuable liquid hydrocarbons to the second of said formations through the same well.

BURTON McCOLLUM.